US012780163B2

(12) United States Patent
Carrara et al.

(10) Patent No.: US 12,780,163 B2
(45) Date of Patent: Nov. 3, 2026

(54) PRIMARY GASKET FOR A CYLINDER ASSEMBLY, CYLINDER ASSEMBLY

(71) Applicant: Brembo S.p.A., Curno (IT)

(72) Inventors: Marco Carrara, Curno (IT); Luca Mazzei, Curno (IT); Paolo Sala, Curno (IT)

(73) Assignee: Brembo S.p.A., Curno (IT)

( * ) Notice: Subject to any disclaimer, the term of this patent is extended or adjusted under 35 U.S.C. 154(b) by 0 days.

(21) Appl. No.: 18/865,100

(22) PCT Filed: May 10, 2023

(86) PCT No.: PCT/IB2023/054823

§ 371 (c)(1),
(2) Date: Nov. 12, 2024

(87) PCT Pub. No.: WO2023/218367

PCT Pub. Date: Nov. 16, 2023

(65) Prior Publication Data

US 2025/0313182 A1 Oct. 9, 2025

(30) Foreign Application Priority Data

May 13, 2022 (IT) ........................ 102022000009947

(51) Int. Cl.
*B60T 11/236* (2006.01)
*B60T 11/232* (2006.01)
*F16J 15/3236* (2016.01)

(52) U.S. Cl.
CPC ........... *B60T 11/236* (2013.01); *B60T 11/232* (2013.01); *F16J 15/3236* (2013.01)

(58) Field of Classification Search
CPC .... B60T 11/236; B60T 11/232; F16J 15/3236
See application file for complete search history.

(56) References Cited

U.S. PATENT DOCUMENTS 4,781,024 A * 11/1988 Nakamura ........... F16J 15/3236 277/572
5,121,686 A * 6/1992 Schonlau ................ F16D 25/12 92/163

(Continued)

FOREIGN PATENT DOCUMENTS

FR 2944761 A1 10/2010
JP 2013071507 A 4/2013

OTHER PUBLICATIONS

European Patent Office, International Search Report and Written Opinion in Application No. PCT/IB2023/054823, dated Aug. 30, 2023 10 pages, Rijswijk, Netherlands.

*Primary Examiner* — Dustin T Nguyen
(74) *Attorney, Agent, or Firm* — Marshall & Melhorn, LLC

(57) ABSTRACT

The present invention relates to a primary gasket (1) for a cylinder assembly (100), wherein said cylinder assembly (100) comprises a cylinder (101) and a float (102) slidingly housed in a float housing (104) delimited by a cylinder wall (103) of said cylinder (101) for pressurizing a fluid, wherein said primary gasket (1) comprises an annular body (2) configured to be accommodated in a primary gasket housing (105) defined in said cylinder wall (103), wherein the primary gasket housing (105) is delimited radially by an axial housing wall (107) and axially by a first radial housing wall (108) and a second radial housing wall (109) connected as an undercut to said axial housing wall (107), wherein said annular body (2) comprises an inner lip (4), a central lip (5), an outer lip (6), and a back portion (3), wherein the back portion (3) comprises a back abutment surface (13) configured to abut against the first radial housing wall (108) of said primary gasket housing (105), wherein the inner lip (4), the central lip (5), and the outer lip (6) extend from the back (Continued)

portion (3) in the axial direction (X-X) spaced apart from one another in the radial direction (R-R) from the opposite side of the back abutment surface (13), wherein the inner lip (4) is configured to form a dynamic and static seal on the float (102), wherein the outer lip (6) is configured to form a seal with said axial housing wall (107), wherein the central lip (5) comprises an annular root (14), which extends axially between said back portion (3) and a root edge (15), wherein the central lip (5) comprises a plurality of protuberances (10, 9), wherein each protuberance (10, 9) projects axially from said root edge (15), wherein said plurality of protuberances (10, 9) and said root edge (15) define a plurality of discharges (8), wherein each discharge (8) is delimited by each protuberance (10) and a first neighboring protuberance (9) thereof of said plurality of protuberances (10, 9) and by a free edge portion of said root edge (15), which extends between each protuberance (10) and the first neighboring protuberance (9) thereof, wherein each protuberance (10, 9) extends circumferentially by one protuberance extension (G), wherein each discharge (8) extends circumferentially by one discharge extension (L), wherein a sum of each discharge extension (L) is greater than a sum of each protuberance extension (G).

11 Claims, 7 Drawing Sheets

(56) References Cited

U.S. PATENT DOCUMENTS

| | | | | |
|---|---|---|---|---|
| 8,578,710 | B2 * | 11/2013 | Aoki | F16J 15/3236 277/436 |
| 8,590,304 | B2 * | 11/2013 | Bernadat | B60T 11/236 60/588 |
| 9,239,110 | B2 * | 1/2016 | Lhuillier | F16J 9/12 |
| 10,183,657 | B2 * | 1/2019 | Matsumura | B60T 11/232 |
| 10,351,114 | B2 * | 7/2019 | Owada | F16J 15/3236 |
| 11,148,649 | B2 * | 10/2021 | Owada | F16J 15/3204 |
| 2006/0064978 | A1 * | 3/2006 | Mouri | B60T 11/20 60/562 |

* cited by examiner

PRIMARY GASKET FOR A CYLINDER ASSEMBLY, CYLINDER ASSEMBLY

FIELD OF THE INVENTION

The present invention relates to a primary gasket for a cylinder assembly, as well as to a cylinder assembly for a hydraulic and/or electrohydraulic system of a vehicle.

BACKGROUND ART

In the field of cylinder assemblies for hydraulic and/or electrohydraulic systems in a vehicle, such as a brake master cylinders and/or brake actuators, it is known to arrange a sealingly movable float inside a hollow cylinder which defines an axial direction A-A, and a radial direction R-R perpendicular to the axial direction.

The float is axially movable in the hollow cylinder between a resting configuration and at least one advanced configuration to pressurize a fluid, e.g., a brake fluid, in a pressure chamber in the hollow cylinder.

When the float is in a resting configuration, the pressure chamber is in fluid communication with a fluid reservoir by means of a supply conduit. When the float is in a resting configuration, the pressure in the pressure chamber is equal to the pressure of the reservoir. When the float advances axially toward the at least one advanced configuration, the pressure chamber and the reservoir are fluidically isolated, allowing the fluid in the pressure chamber to be pressurized.

The float is axially movable by sliding tightly on a primary gasket and a secondary gasket which are accommodated in respective housings or grooves, a primary housing and a secondary housing, made in the wall of the hollow cylinder. The primary housing and the secondary housing are made in the wall of the hollow cylinder. The supply conduit leads radially from the hollow cylinder wall into a supply opening arranged between the primary housing and the secondary housing.

The secondary gasket is adapted to form a static and dynamic seal between the cylinder and the float to avoid the fluid in the reservoir and/or pressure chamber, when in fluid communication with the reservoir, from flowing into the cylinder in the opposite direction to the pressure chamber. For example, the secondary gasket serves the function of hydraulically isolating the electromechanical components accommodated in the cylinder on the side opposite to the pressure chamber, and/or preventing leakages of hydraulic fluid from the pressure chamber.

The primary gasket is adapted to keep the fluid pressurized in the pressure chamber, preventing fluid passages from the pressure chamber to the reservoir when the float is in an advanced position in the cylinder. In this case, the primary gasket is in a fluid isolation configuration, with a back portion thereof abutting against a first radial wall of primary housing.

If the hydraulic system needs a further pressure increase, at least one valve which increases the pressure in the reservoir is opened in order to trigger a flow of fluid from the reservoir to the pressure chamber, avoiding the primary gasket from preventing such a fluid passage, thus increasing the pressure in the pressure chamber.

In order to fulfill this function, the primary gasket is a three-lip gasket comprising an inner lip, a central lip, and an outer lip which project from the back portion to be radially and mutually spaced apart. The inner lip is configured to form a seal with the float. The outer lip is configured to form a seal with an outer wall of the primary housing when the pressure in the pressure chamber is higher than the pressure in the reservoir, thus fluidically isolating the pressure chamber and the reservoir. The outer lip is configured to bend toward the central lip moving away from the outer wall of the housing when the pressure in the reservoir is higher than the pressure in the pressure chamber, thus allowing a fluid communication between the reservoir and the pressure chamber. When the reservoir pressure exceeds the pressure chamber pressure, the primary gasket is configured to slide axially in the primary housing from the fluid isolation configuration to a fluid communication configuration, thus axially abutting with the central lip against a second radial wall of primary housing axially opposite to said first radial wall. In some cases, the central lip is further configured to bend toward the inner lip, allowing the reservoir and the pressure chamber to be fluidically connected, thus allowing the pressure in the pressure chamber to be increased.

Once the at least one valve is closed, the primary gasket is configured to slide axially to the fluid isolation configuration, abutting with the back portion against the first radial wall until it fluidically isolates the reservoir and the pressure chamber.

It has been found in the industry that when the primary gasket is overstressed in the fluid communication configuration, the outer lip and the central lip can bend excessively leading to the rotation of the primary gasket in the primary housing, which can compromise the return of the primary gasket to the fluid isolation configuration, thus jeopardizing the proper operation of the cylinder assembly.

Therefore, the need to stabilize the primary gasket when working in the fluid communication configuration is strongly felt in the industry, reducing the risk of unintended rotations of the primary gasket which can obstruct the passage of fluid from the reservoir to the pressure chamber and/or vice versa.

Therefore, the need to avoid as much as possible a bending of the central lip which could lead to rotation of the primary gasket is strongly felt in the industry.

Solution

It is the object of the present invention to provide a primary gasket for a cylinder assembly which allows solving the complained problems of the prior art.

This and other objects and advantages are achieved by a primary gasket and cylinder assembly according to the claims.

Some advantageous embodiments are the subject of the dependent claims.

By virtue of the suggested solutions, a high fluid passage can be ensured through the central lip, reducing the resistance to fluid passage compared to the prior art.

By virtue of the suggested solutions, a high fluid passage can be ensured, reducing the tendency of the central lip to bend.

By virtue of the suggested solutions, a seamless abutment circumferentially intercalated with central lip discharges of the central lip against the radial wall of the primary gasket housing can be ensured, so as to ensure low resistance to the passage of fluid on the one hand, and high bending resistance or structural strength of the central lip on the other hand, keeping the central lip stably abutting.

FIGURES

Further features and advantages of the primary gasket and the cylinder assembly will become apparent from the following description of preferred embodiments thereof, given by way of non-limiting indication, with reference to the accompanying drawings, in which.

DESCRIPTION OF SOME PREFERRED EMBODIMENTS

Figure 1:
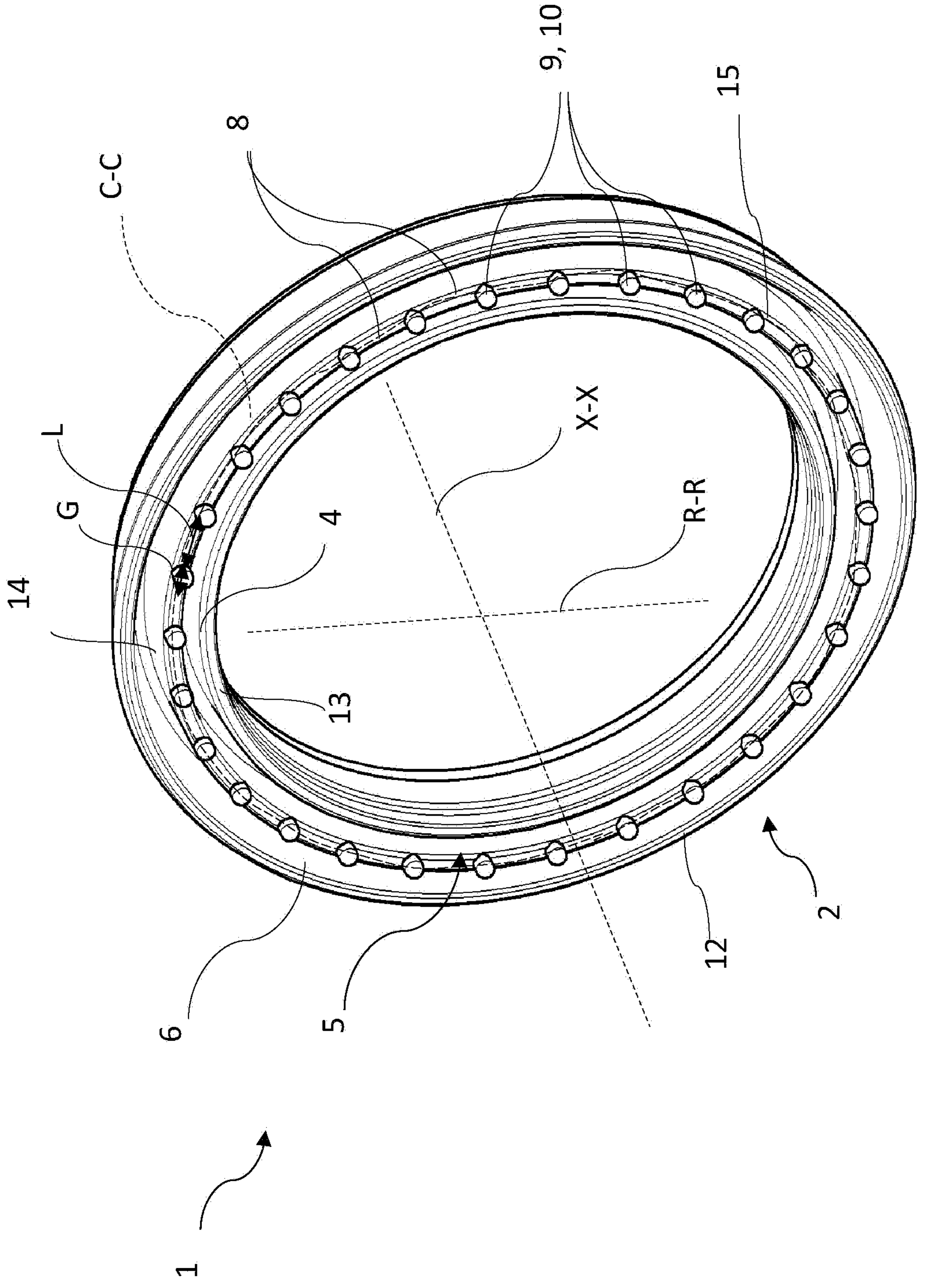
FIG. 1 is an axonometric view of a primary gasket according to the present invention showing an annular gasket body having an inner lip, an outer lip, and a central lip projecting in an axial direction from a gasket back portion, where the central lip comprises a plurality of protuberances intercalated by a plurality of discharges.
Figure 2:
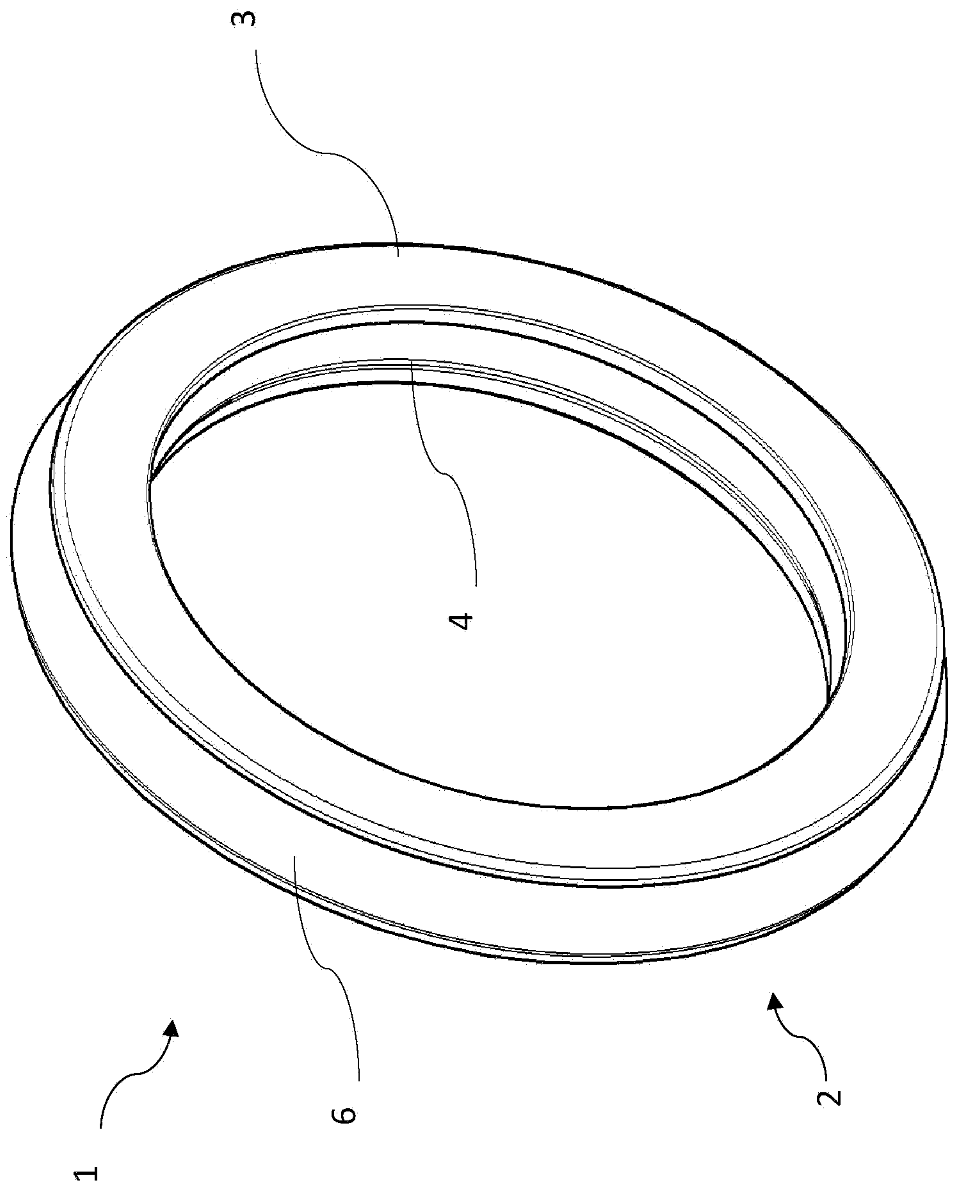
FIG. 2 is an axonometric view of the primary gasket in FIG. 1 seen from an opposite direction, showing the back portion of the primary gasket.
Figure 3:
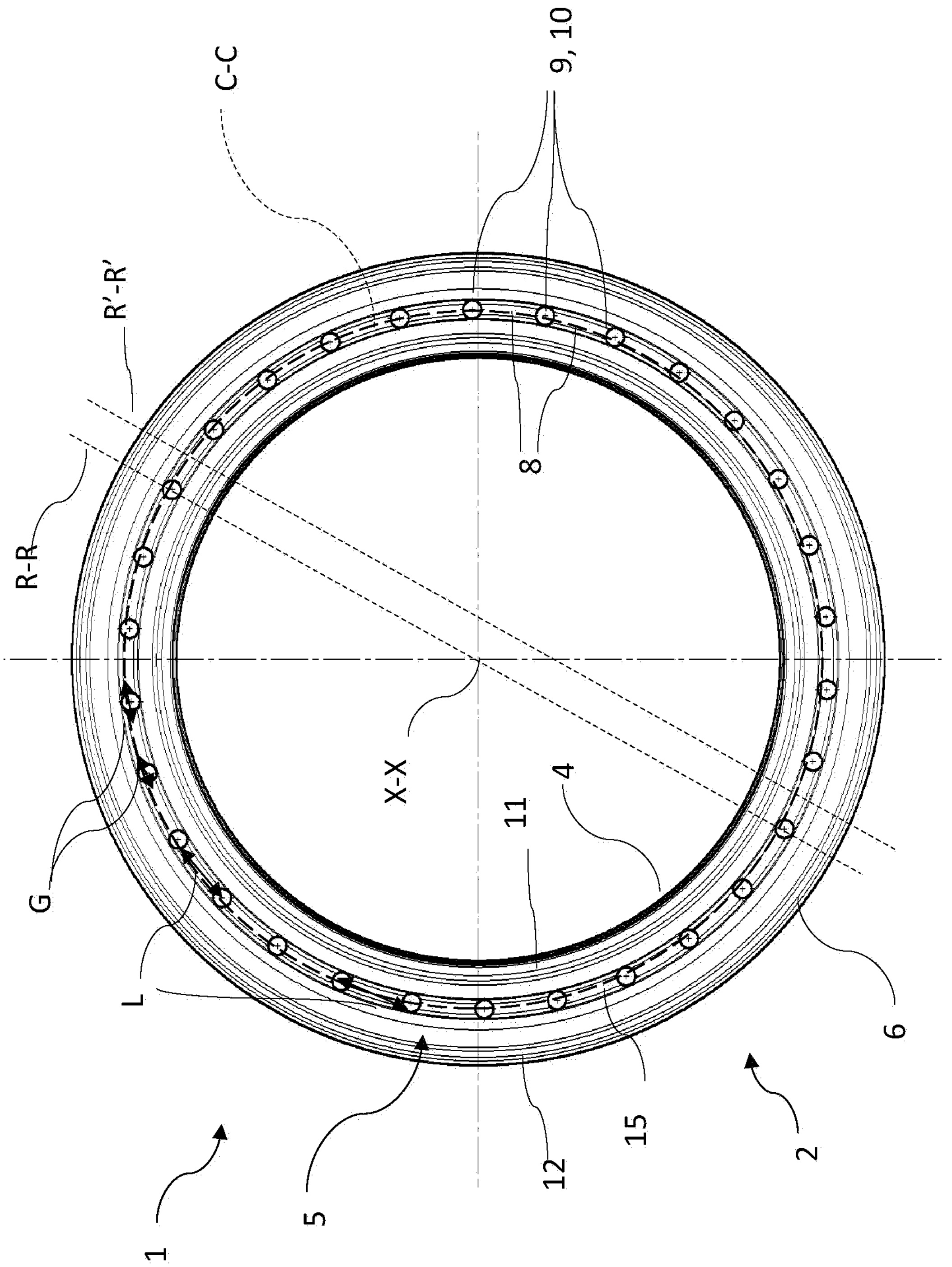
FIG. 3 shows a front view of the primary gasket in FIG. 1.
Figure 4:
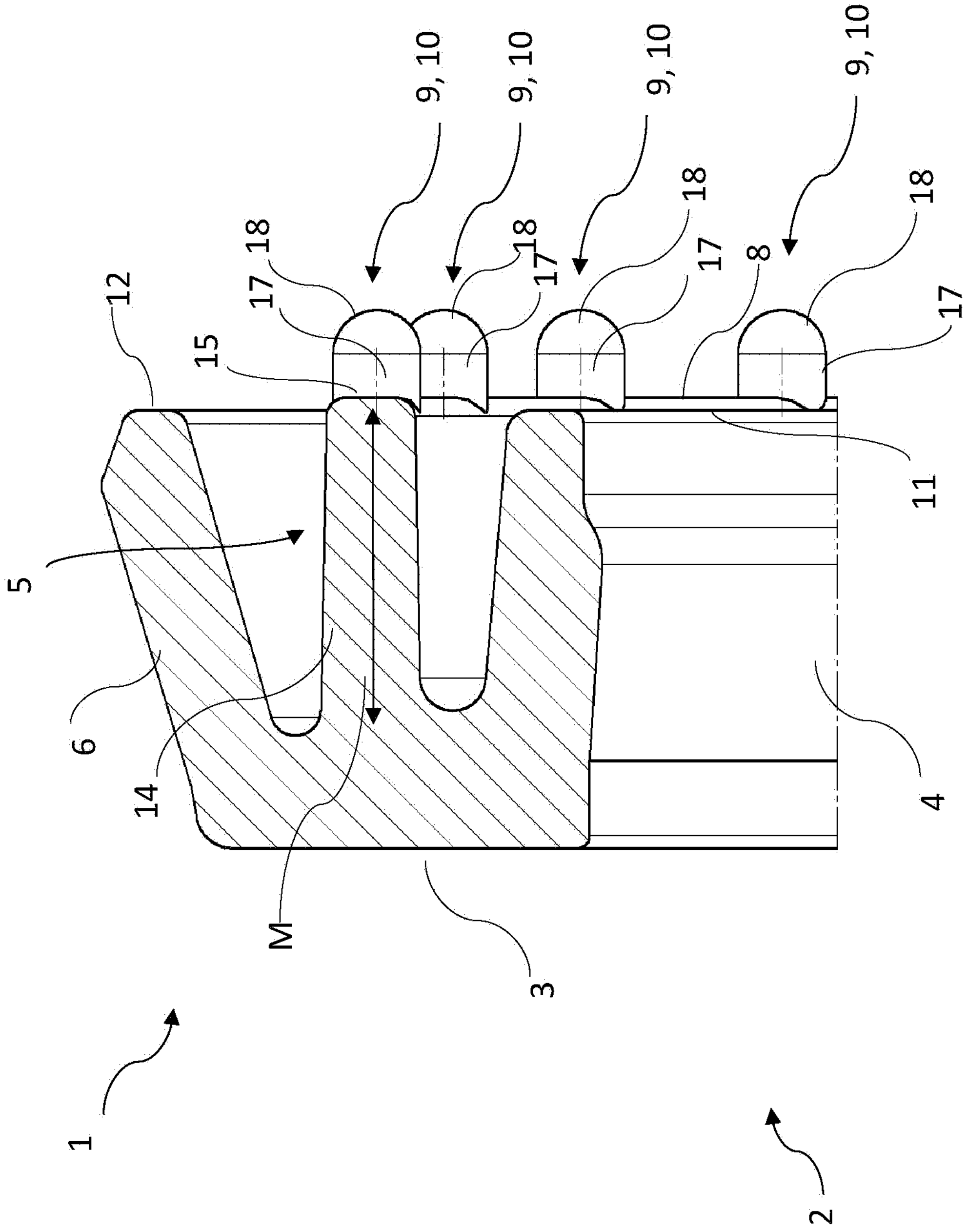
FIG. 4 shows the gasket in FIG. 1 sectioned along a parallel plane and comprising the radial direction R'-R' in FIG. 3, in which the central lip is sectioned at a discharge of the plurality of discharges.
Figure 5:
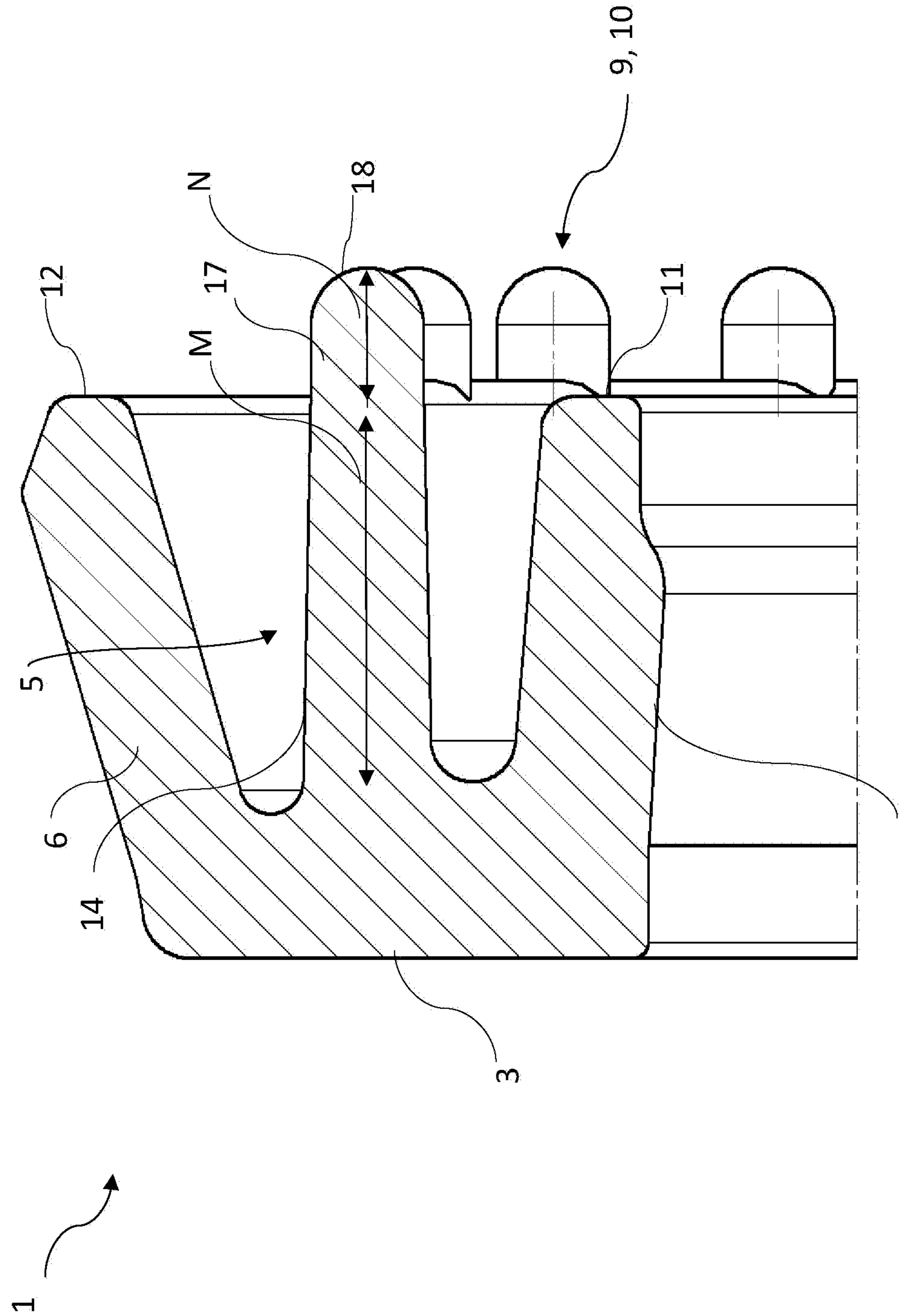
FIG. 5 shows the gasket in FIG. 1 sectioned along a parallel plane and comprising the radial direction R-R shown in FIG. 3, in which the central lip is sectioned at a protuberance of the plurality of protuberances.
Figure 6:
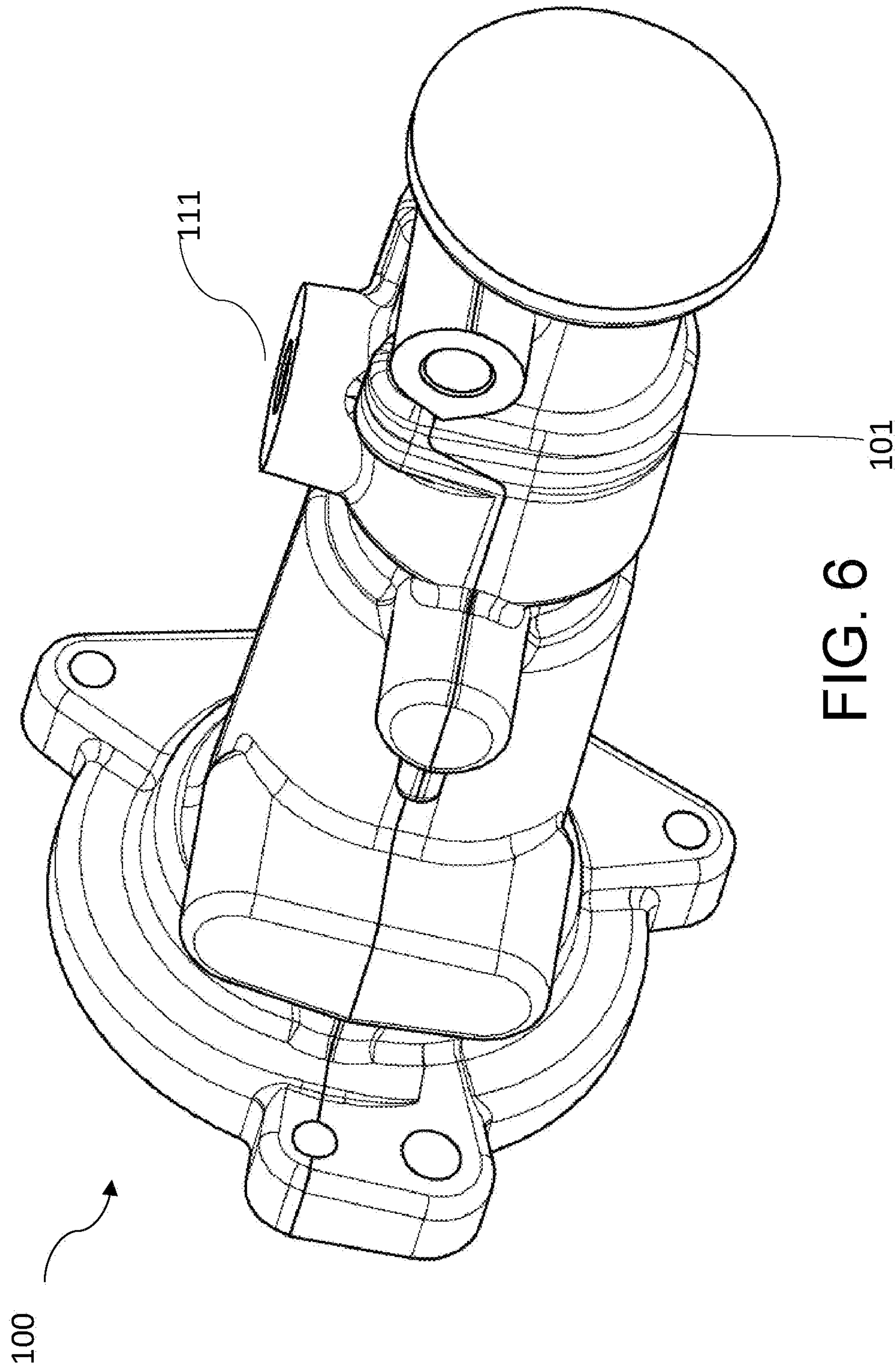
FIG. 6 is an axonometric view of a cylinder assembly according to the present invention, e.g., a brake master cylinder actuatable by a lever to pressurize a fluid, or a linear actuator for BBW (Brake By Wire) systems governed by an electric motor to pressurize a brake fluid.
Figure 7:
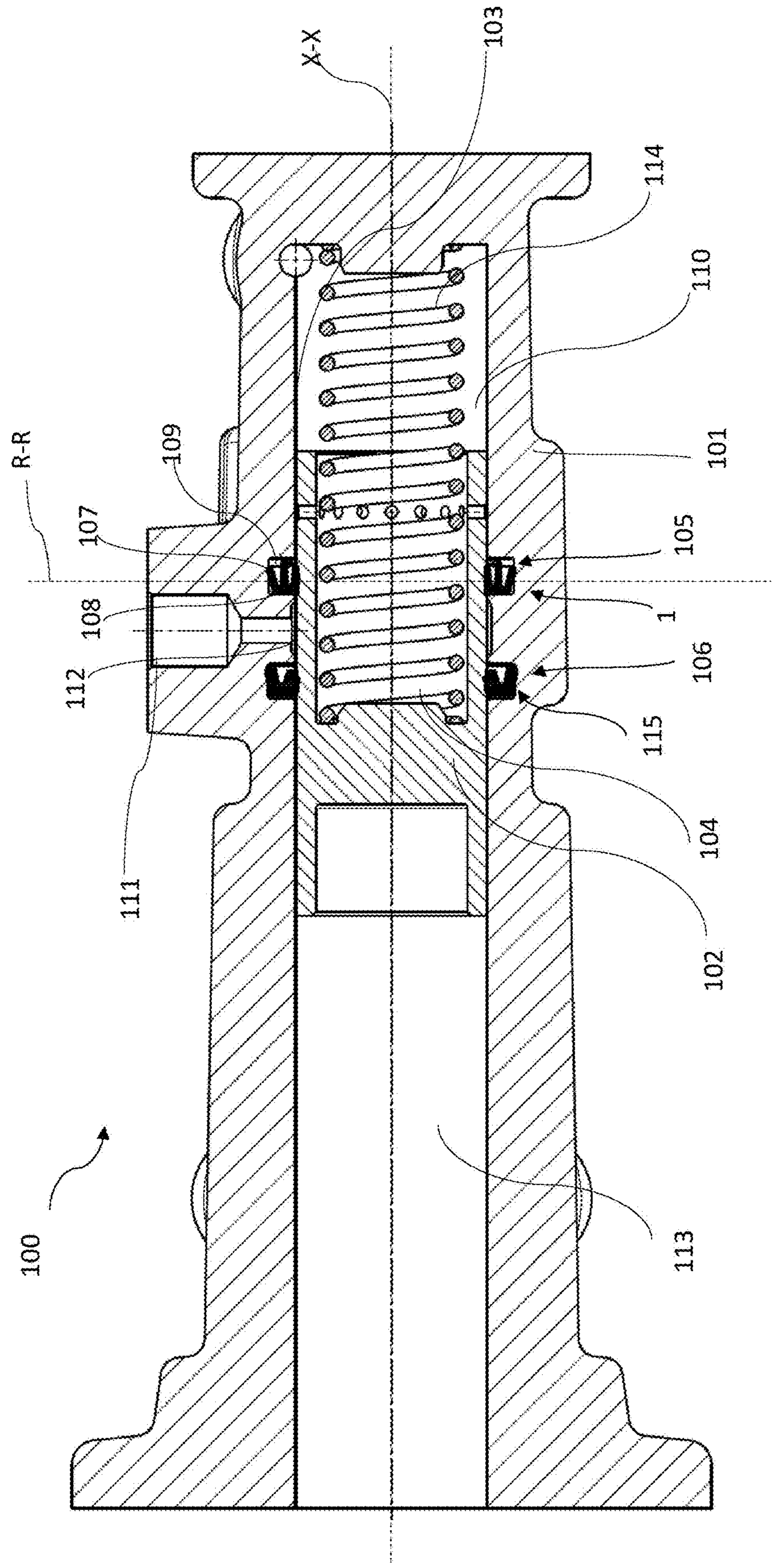
FIG. 7 is a section view of the cylinder assembly in FIG. 6 sectioned along a section plane perpendicular to the axial direction X-X and the radial direction R-R, showing the float or piston slidingly accommodated in the float housing made in the sealed cylinder by virtue of the primary gasket in FIG. 1, and a secondary gasket.

According to a general embodiment, a primary gasket for a cylinder assembly is indicated by reference numeral 1. Said cylinder assembly 100 comprises a cylinder 101 and a float 102 slidingly accommodated in a float housing 104 delimited by a cylinder wall 103 of said cylinder 101 for pressurizing a fluid. For example, said cylinder assembly 100 is a brake master cylinder or an electrically controlled actuator. According to an embodiment, said electrically controlled actuator is a linear actuator.

The primary gasket 1 comprises an annular body 2, which extends circumferentially at least along a circumferential direction C-C about an axial direction X-X, where said primary gasket 1 defines a radial direction R-R perpendicular to said axial direction X-X and said circumferential direction C-C.

Said annular body 2 is configured to be accommodated in a primary gasket housing 105 defined in said cylinder wall 103. The primary gasket housing 105 is delimited radially by an axial housing wall 107 and axially by a first radial housing wall 108 and a second radial housing wall 109, connected as an undercut to said axial housing wall 107.

Said annular body 2 comprises an inner lip 4, a central lip 5, an outer lip 6, and a back portion 3.

The back portion 3 comprises a back abutment surface 13 configured to abut against the first radial housing wall 108 of said primary gasket housing 105.

The inner lip 4, the central lip 5, and the outer lip 6 extend from the back portion 3 in the axial direction X-X spaced from one another in the radial direction R-R from the opposite side of the back abutment surface 13.

The inner lip 4 is configured to form a dynamic and static seal on the float 102.

The outer lip 6 is configured to form a seal with said axial housing wall 107.

The central lip 5 comprises an annular root 14, which extends axially between said back portion 3 and a root edge 15.

The central lip 5 comprises a plurality of protuberances 10, 9, where each protuberance 10, 9 projects axially from said root edge 15.

Said plurality of protuberances 10, 9 and said root edge 15 define a plurality of discharges 8.

Each discharge 8 is delimited circumferentially by each protuberance 10 and a first neighboring protuberance 9 thereof of said plurality of protuberances 10, 9, and axially by a free edge portion of said root edge 15, which extends between each protuberance 10 and the first neighboring protuberance 9 thereof.

Each protuberance 10, 9 extends circumferentially by a protuberance extension G.

Each discharge 8 extends circumferentially by a discharge extension L.

Advantageously, a sum of each discharge extension L is greater than a sum of each protuberance extension G.

According to an embodiment, the sum of each discharge extension L and each protuberance extension G is equal to the circumferential extension of the root edge 15.

According to an embodiment, the sum of each discharge extension L is at least two times greater than the sum of each protuberance extension G.

According to an embodiment, the sum of each discharge extension L is at least three times greater than the sum of each protuberance extension G.

According to an embodiment, said protuberances of said plurality of protuberances 10 are circumferentially equidistant from one another along said discharge extension L.

According to an embodiment, each protuberance 10 and each first neighboring protuberance extend circumferentially with said protuberance extension G.

According to an embodiment, said discharge extension L is equal to at least said protuberance extension G.

According to an embodiment, said discharge extension L is equal to at least twice said protuberance extension G.

According to an embodiment, said discharge extension L is between at least three times said protuberance extension G and at least five times said protuberance extension G.

By virtue of the provision of the sum of discharge extensions being higher than the sum of the protuberance extensions, a high fluid passage is possible when the protuberances 9, 10 abut against the second radial housing wall.

According to an embodiment, each protuberance 9, 10 comprises a protuberance body 17 projecting from said annular root 13 and a protuberance head 18 connected to said protuberance body 17. Said protuberance head is configured to abut against said second radial housing wall 109, avoiding said root edge from abutting against said second radial housing wall 109 by allowing a passage of fluid through said plurality of discharges 8.

According to an embodiment, said protuberance extension G is equal to the maximum circumferential dimension of the protuberance body 17 at the connection with the root edge 15.

According to an embodiment, said discharge extension L is equal to the circumferential distance along said root edge 15 between two first neighboring protuberance bodies.

According to an embodiment, said annular root 13 axially has a root extension M between said back portion 3 and said root edge 15.

According to an embodiment, each protuberance 9, 10 axially has an axial protuberance extension N between said root edge 15 and a protuberance end.

According to an embodiment, the axial root extension M is between two times the axial protuberance extension N and six times the axial protuberance extension N.

By virtue of the provision of the annular root 14 and protuberances 9, 10 projecting from the root edge 15, said discharges 8 can be made as radial openings having a circumferential extension equal to the discharge extension and an axial extension equal to the axial protuberance extension N, where the radial openings are spaced apart from the back portion 3 by at least the axial root extension M, thus ensuring a high bending resistance for the central lip.

According to an embodiment, said protuberance body 17 cylindrical and/or prismatic in shape. According to an embodiment, each protuberance body 17 in cylindrical and/or prismatic in shape. According to an embodiment, said protuberance head 18 and/or each protuberance head 18 is tapered with respect to said protuberance body 17.

According to an embodiment, said protuberance head 18 is made in one piece with said protuberance body 17.

According to an embodiment, said protuberance head 18 and/or each protuberance head 18 is cylindrical in shape.

According to an embodiment, said protuberance head 18 and/or each protuberance head 18 has a rounded shape in the opposite direction to said annular root. According to an embodiment, said protuberance head 18 has a hemispherical or spherical cap shape, so as to abut against a circular surface. According to an embodiment, said protuberance head 18 has an apex portion having a partial spherical cap shape connected to a connecting portion having a cone-shaped side wall which tapers from the protuberance body 17 to the apex portion.

By virtue of the provision of said cylindrical protuberance body and/or said rounded protuberance head 18, it is possible to reduce the exposed surface area of the protuberance perpendicularly to the fluid passage direction, allowing a reduction in terms of fluid passage resistance.

According to an embodiment, each discharge of said plurality of discharges 8 has a substantially U-shaped profile.

According to an embodiment, said root edge 15 is an annular edge, tapered in axial direction, avoiding comprising flat surfaces perpendicular to the axial direction.

According to an embodiment, the inner lip 4, the outer lip 6, and the annular root 14 have substantially the same axial dimension in the axial direction X-X.

According to an embodiment, the number of said plurality of protuberances 9, 10 is between 10 and 100, preferably between 20 and 60, even more preferably 30.

According to an embodiment, said gasket body is made of polymer material for gaskets, e.g., gasket rubber, preferably EPDM (Ethylene-Propylene Diene Monomer).

The present invention also relates to a cylinder assembly 100 for a braking system.

Said cylinder assembly 100 comprises a cylinder 101. Said cylinder 101 comprises a cylinder wall 103 internally delimiting a float housing 104. Said cylinder wall 103 delimits a pressure chamber fluidically connectable to a braking device. Said cylinder wall 103 delimits a primary gasket housing 105 and a secondary gasket housing 106. Said cylinder 101 defines a supply conduit 111 fluidically connectable to a reservoir and/or a fluid feeding valve, where said supply conduit 111 leads into a supply opening 112 on said cylinder wall 103 between said primary gasket housing 105 and said secondary gasket housing 106.

Said cylinder assembly 100 comprises a float 102. The float 102 is slidingly accommodated in a sealing manner in the float housing 104 to pressurize a fluid in a pressure chamber 110 fluidically connectable to a braking device.

Said cylinder assembly 100 comprises a primary gasket 1 according to any one of the previously described embodiments. The primary gasket 1 is accommodated in said primary gasket housing 105 with axial clearance between said first radial housing wall 108 and second said radial housing wall 109. When the primary gasket 1 abuts against said first radial housing wall 108, it forms a seal with said float 102 and said axial wall 107 of primary housing thus fluidically isolating the pressure chamber and the supply conduit 111. When the primary gasket 1 abuts against said second radial housing wall 109, it forms a seal with said float 102 avoiding the formation of a seal with the axial wall 107 of the primary housing to fluidically connect the supply conduit 111 and the pressure chamber 110 to increase the fluid pressure.

Said cylinder assembly 100 comprises a secondary gasket 115 accommodated in the secondary gasket housing 106 to form a static and dynamic seal with said float and said cylinder wall 103.

According to an embodiment, said secondary gasket 115 is a two-lip gasket.

According to an embodiment, said cylinder assembly 100 is a brake master cylinder.

According to an embodiment, said cylinder assembly 100 is an actuator for BBW (Brake By Wire) applications.

According to an embodiment, said cylinder assembly 100 comprises an actuator motor 113.

According to an embodiment, said cylinder assembly 100 comprises an elastic element 114 accommodated inside said cylinder 101, which constantly biases said float 102 in the opposite direction to a float advancement direction.

According to an embodiment, the float 102 is axially movable between a resting configuration and at least one advanced configuration to pressurize a fluid, such as a brake fluid, in the pressure chamber.

According to an embodiment, the primary gasket 1 is axially movable in the primary gasket housing between a fluid isolation configuration, in which the back portion 3 abuts against the first radial housing wall and the outer lip forms a seal with the axial wall and the inner lip forms a seal with the float 102, and a fluid communication configuration, in which the protuberances 10, 9 abut against the second radial housing wall and the outer lip is spaced apart from the axial wall and the inner lip forms a seal with the float 102.

According to an embodiment, the float comprises a float body having a hollow portion delimited by a float wall, where the hollow portion is in fluid connection with the pressure chamber, where the float wall has a through opening. As long as said through opening is arranged between the primary gasket and the secondary gasket, the pressure chamber is in fluid communication with said supply conduit through said through opening. When said float is in said advanced configuration in which said through opening is axially advanced with respect to the primary gasket, the pressure chamber is fluidically isolated from the supply conduit by means of the primary gasket in the fluid isolation configuration, and the float pressurizes the fluid in the pressure chamber. When the fluid in the supply conduit exceeds the fluid pressure in the pressure chamber, the primary gasket switches to the fluid communication configuration, allowing the pressure in the pressure chamber to be increased.

LIST OF REFERENCE SIGNS

1 primary gasket
2 annular body
3 back portion
4 inner lip
5 central lip
6 outer lip
7 central lip abutment portion
8 plurality of discharges
9 first neighboring protuberance
10 protuberance
11 inner lip end
12 outer lip end
13 back abutment surface
14 annular root
15 root edge
16 free edge portion
17 protuberance body
18 protuberance head
100 cylinder assembly
101 cylinder
102 float
103 cylinder wall
104 float housing
105 primary housing or primary gasket housing
106 secondary housing or secondary gasket housing
107 axial wall of primary housing
108 first radial wall of primary housing
109 second radial wall of primary housing
110 pressure chamber
111 supply conduit
112 supply opening
113 actuator motor
114 elastic element
115 secondary gasket
X-X axial direction
R-R radial direction
L circumferential discharge extension
G circumferential protuberance extension
N axial protuberance extension
M axial root extension

The invention claimed is:

1. A primary gasket for a cylinder assembly, wherein said cylinder assembly-comprises a cylinder and a float-slidingly housed in a float housing delimited by a cylinder wall-of said cylinder for pressurizing a fluid, wherein the primary gasket comprises an annular body, which extends circumferentially at least along a circumferential direction about an axial direction, wherein said primary gasket defines a radial direction perpendicular to said axial direction and said circumferential direction, wherein said annular body-is configured to be accommodated in a primary gasket housing defined in said cylinder wall, in which the primary gasket housing is delimited radially by an axial housing wall and axially by a first radial housing wall and a second radial housing wall connected in an undercut manner to said axial housing wall, wherein said annular body comprises an inner lip, a central lip, an outer lip, and a back portion, wherein the back portion comprises a back abutment surface configured to abut against the first radial housing wall of said primary gasket housing, wherein the inner lip, central lip, and outer lip extend axially from the back portion, on a side opposite the back abutment surface, radially spaced apart from one another, wherein the inner lip-is configured to form a seal with said float, wherein the outer lip is configured to form a seal with said axial housing wall, wherein the central lip comprises an annular root, which extends axially between said back portion and a root edge, wherein the central lip comprises a plurality of protuberances, wherein each protuberance protrudes axially from said root edge, wherein said plurality of protuberances and said root edge define a plurality of discharges, wherein each discharge is delimited by each protuberance and one of a neighboring protuberance of said plurality of protuberances and by a free portion of an edge of said root edge, which extends between each protuberance and the neighboring protuberance, wherein each protuberance extends circumferentially by one protuberance extension, wherein each protuberance comprises a protuberance body, which protrudes from said annular root, and a protuberance head connected to said protuberance body, wherein said protuberance head-is configured to abut against said second radial housing wall, preventing said root edge from abutting against said second radial housing wall allowing a passage of the fluid through said plurality of discharges, wherein said protuberance body has a cylindrical and/or prismatic shape, wherein said protuberance head has a rounded shape in an opposite direction to said annular root, wherein each discharge extends circumferentially by one discharge extension, wherein a sum of each discharge extension is greater than a sum of each protuberance extension.

2. A primary gasket according to claim 1, comprising at least one of the following features or a combination thereof:

wherein the sum of each discharge extension is at least two times greater than the sum of each protuberance extension, and/or wherein the sum of each discharge extension is at least three times greater than the sum of each protuberance extension, and/or wherein each said protuberance of said plurality of protuberances are circumferentially equidistant from one another along said discharge extension, and/or wherein each protuberance and each first neighboring protuberance extend circumferentially with said protuberance extension.

3. A primary gasket according to claim 2, comprising at least one of the following features or a combination thereof:

wherein said discharge extension is equal to at least said protuberance extension, and/or wherein said discharge extension is equal to at least twice said protuberance extension, and/or wherein said discharge extension is comprised between at least three times said protuberance extension and at least five times said protuberance extension.

4. A primary gasket according to claim 1, wherein said annular root has an axial root extension between said back portion and said root edge, wherein each protuberance has an axial protuberance extension between said root edge and a protuberance end, and wherein the axial root extension is comprised between two times the axial protuberance extension and six times the axial protuberance extension.

5. A primary gasket according to claim 4, comprising at least one of the following features or a combination thereof:

wherein said protuberance head is made in one piece with said protuberance body;

and/or wherein said protuberance head is tapered relative to said protuberance body.

6. A primary gasket according to claim 5, wherein said protuberance head has a cylindrical shape.

7. A primary gasket according to claim 6, wherein each discharge of said plurality of discharges has a U-shaped profile, and/or wherein said root edge is an annular edge.

8. A primary gasket according to claim 1, comprising at least one of the following features or a combination thereof:

wherein the inner lip, outer lip, and annular root-have the same axial dimension in the axial direction, and/or wherein there are from 10 to 90 of said plurality of protuberances.

9. A primary gasket according to claim 1, wherein said protuberance head has a hemispherical or a spherical cap, wherein said protuberance head abuts against a circular surface.

10. A cylinder assembly for a braking system, comprising a cylinder wherein said cylinder comprises a cylinder wall, which internally delimits a floating housing, wherein said cylinder wall delimits a pressure chamber fluidically connectable to a braking device, wherein said cylinder wall delimits a primary gasket housing and a secondary gasket housing, wherein the primary gasket housing is radially delimited by an axial housing wall and axially delimited by a first radial housing wall and a second radial housing wall connected to said axial housing wall, wherein said cylinder defines a supply conduit fluidically connectable to a reservoir and/or fluid feeding valve, wherein said supply conduit leads into a supply opening on said cylinder wall between said primary gasket housing and said secondary gasket housing, a float, wherein the float is slidingly accommodated in a sealing manner in the float housing to pressurize a fluid in a pressure chamber fluidically connectable to a braking device, a primary gasket, wherein said primary gasket comprises a central lip which comprises a plurality of protuberances, wherein each protuberance protrudes axially from a root edge, wherein each protuberance comprises a protuberance head, wherein each protuberance head has a rounded shape in the opposite direction to an annular root, wherein said primary gasket is accommodated in said primary gasket housing with axial clearance between said first radial housing wall and said second radial housing wall, wherein said primary gasket when it abuts against said first radial housing wall is configured to form a seal with said float, said axial housing wall fluidically isolating the pressure chamber and supply conduit, and wherein said primary gasket when it abuts against said second radial wall is configured to form a seal with said float preventing a formation of a seal with said axial housing wall to fluidically connect the supply conduit and the pressure chamber to increase a fluid pressure in the pressure chamber, a secondary gasket accommodated in the secondary gasket housing to form a static and dynamic seal with said float and said cylinder wall.

11. A cylinder assembly according to claim 10 wherein said cylinder assembly is a master cylinder or is an actuator for BBW (Brake By Wire) applications.

* * * * *